July 10, 1928.
W. J. BOHN
1,676,978
CONVEYER
Filed Aug. 3, 1925
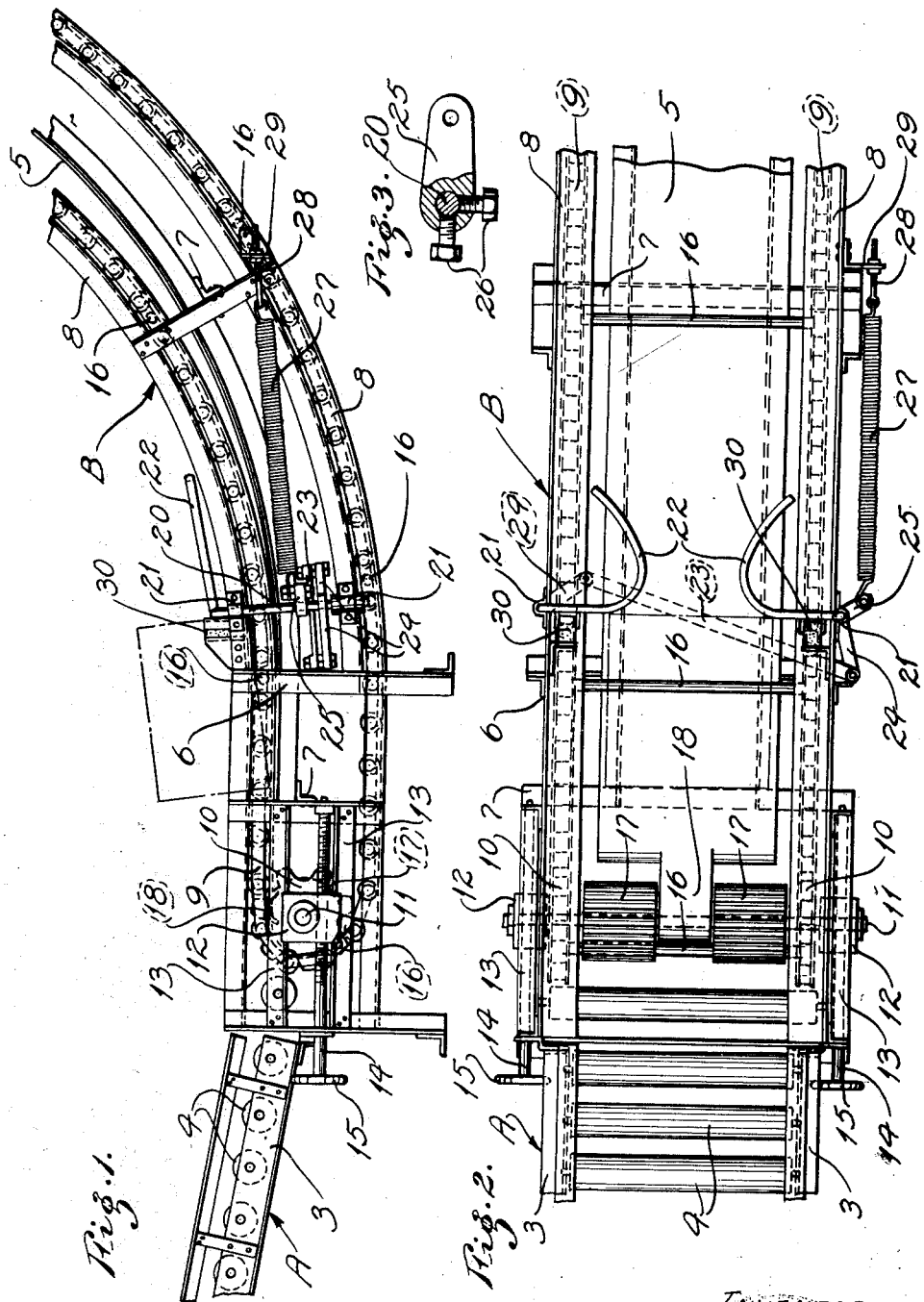
INVENTOR
William J. Bohn,
by Carr & Carr,
HIS ATTORNEYS Patented July 10, 1928.

1,676,978

UNITED STATES PATENT OFFICE.

WILLIAM J. BOHN, OF ST. LOUIS, MISSOURI, ASSIGNOR TO ALVEY MANUFACTURING COMPANY, OF ST. LOUIS, MISSOURI, A CORPORATION OF MISSOURI.

CONVEYER.

Application filed August 3, 1925. Serial No. 47,680.

This invention relates principally to power conveyers of the inclined elevator type, wherein pushing or propelling devices engage articles that are fed to the elevator and force said articles up the inclined way thereof.

The present invention has for its principal object to provide a simple and efficient arrangement that will insure proper engagement of the articles by the pushing or propelling devices of the power conveyer and center the same thereon. Other objects are reduced cost of manufacture and installation and compactness of design.
The invention consists principally in an article retarding device comprising a pair of reversely curved pivotally mounted spring controlled arms located in the path of the articles at the receiving end of the power conveyer and linked together for swinging movement toward and away from each other. It also consists in combinations and arrangements of parts hereinafter described and claimed.
In the accompanying drawing which forms part of this specification and wherein like symbols refer to like parts wherever they occur, Fig. 1 is a side view showing the adjacent end portions of a gravity conveyer and an inclined elevator provided with improvements embodying my invention;

Fig. 2 is a plan view of the parts shown in Fig. 1; and Fig. 3 is a horizontal section through one of the rock rods, showing the manner of adjustably securing the rock arm thereto.

The conveying device shown in the accompanying drawing comprises a gravity conveyer A and an inclined power driven elevator B, whose receiving end is arranged adjacent to the delivery end of said gravity conveyer and is suitably connected therewith.

The gravity conveyer A, which may be of any suitable type, comprises spaced side rails 3 of angle section having a series of conveyer rollers 4 disposed crosswise thereof whose ends are rotatably supported on said side rails.
As shown in the accompanying drawing, the inclined elevator or power conveyer B comprises a bed or way in the form of a plate 5 having a horizontal receiving portion and an inclined portion adapted to extend to an upper floor or level (not shown). The way is suitably supported by a framework comprising side frames 6 connected by suitable cross members 7.

Running between upper and lower pairs of angles 8, which form part of the side frames 6 of the conveyer B and extend longitudinally thereof on opposite sides of the bed 5, are the upper and lower stretches of a pair of endless conveyer chains 9. The pairs of angles 8 serves as guides for the upper and lower stretches of the endless chains 9 which run therebetween, the lowermost angles of each pair constituting supports for said chains. The endless sprocket chains 9 pass around idler sprocket wheels 10 fixed to the ends of a transverse shaft 11 located beneath the article way 5 adjacent to the horizontally disposed receiving end thereof. The shaft 11 has its ends journaled in bearing blocks 12 slidably arranged between vertically spaced horizontally disposed angles 13 secured to the vertical members of the side frame.

The slide blocks 12 may be adjusted to tighten or loosen the sprocket chains 9, by means of adjusting screws 14 mounted on the side frames 6 and provided with hand wheels 15 to facilitate turning thereof. At the upper end of the elevator, the sprocket chains 9 pass over power driven sprocket wheels (not shown). The sprocket chains 9 are connected by article propelling or pushing devices in the form of spaced pusher-bars 16 disposed crosswise of the article way 5. These pusher bars move with the sprocket chains and pass above and below the way and upwardly around the receiving end thereof, the spacing of said bars depending on the size of the article that is to be conveyed.

Fixed to the sprocket shaft 11 are corrugated feed rolls 17. These rolls are disposed with their outer ends substantially flush with the side edges of the way 5 and are spaced apart on opposite sides of the longitudinal center line of said way. The lower or receiving end of the way has a central extension 18 of reduced width which extends between the spaced feed rolls 17. The lower or receiving end of the way or bed 5 of the inclined elevator is disposed below the tops of the feed rolls 17 and below the top of the adjacent endmost roller of the feeding conveyer A.

With this arrangement thus far described, articles that are fed by the gravity conveyer A to the receiving end of the inclined elevator are engaged on their undersides by the rotating feed rolls and are thus pushed onto the horizontal receiving portion of the inclined way in position to be engaged by the traveling pusher bars; and such articles, if properly engaged at their rear ends by said pusher bars, will be pushed up the inclined portion of the said way to the discharge end thereof. In some instances, however, articles that have been deposited upon the receiving end of the way are engaged on their undersides by the rising pusher bars and dragged partway up the inclined portion thereof and then slide backwards and strike the article following, thus damaging both articles and sometimes causing one or the other or both to leave the elevator and fall to the floor.

The present invention overcomes this difficulty by providing the elevator with a yieldable article retarding device which permits forward movement of articles that are properly engaged by the pusher bars, but prevents forward movement of articles that are improperly engaged by said pusher bars. Said yieldable article-retarding device comprises a pair of oppositely disposed upright rock rods 20 disposed one on each side of the conveyer and rotatably secured to the side rails thereof by means of upper and lower bearings 21. At their upper ends, said pair of rock rods are provided with reversely curved arms 22 that are bent inwardly towards each other over the article way into the path of the articles and are thence bent forwardly in the direction in which the articles travel and outwardly towards the sides of the conveyer. The upright rock rods 20 are linked together for joint swinging movement towards and away from each other by means of a transverse link 23, which is located beneath the article way of the elevator and is pivotally connected at its opposite ends to lever arms 24 fixed to the lower ends of said rock rods. One of the rock rods has a rock arm 25 adjustably secured to its lower end by means of set screws 26.

A coil spring 27 has one end secured to the outer end of the rock arm 25; and its other end is hooked into an eyebolt 28 fixed to the laterally extending flange of an angle bracket 29 which is riveted to the lower side rail of the inclined elevator. This spring is arranged to exert a forward pull on the rock arm 25 at the lower end of the rock rod and thus serves to yieldably retain the reversely curved arms 22 of the rock rods inwardly in the path of the articles. The inward swinging movement of the curved arms is limited by means of leather covered stop blocks 30 which are secured to the opposite sides of the elevator frame in position to be engaged by said arms. The tension of the coil spring 27 may be adjusted, to vary the force or pressure necessary to swing the reversely curved arms outwardly, by adjusting the angular position of the rock arm 25 and the rock rod.

By the arrangement described, articles that are properly engaged by the pusher bars of the elevator are pressed against the reversely curved arms of the rock rods with a force that is sufficient to cause said arms to swing apart and permit the passage of said articles therebetween. In the event that an article is engaged on its underside by a pusher bar, the resistance of the swinging arms is sufficient to prevent further movement of the articles along the way until the pusher bar on the underside of the article has passed from beneath said article, which remains in this position until properly engaged by a succeeding pusher bar.

It is noted that the inner portions of the reversely curved arms have a relatively small radius of curvature and that the outer free end portions of said arms have a relatively large radius of curvature. By this arrangement, said arms, when engaged by an article, are adapted to swing apart quickly to permit the article to enter therebetween and are adapted to remain in contact with the articles until they have returned to their normal positions, thereby preventing jarring or noise during such return movement. It is also noticed that my device is capable of taking care of articles of different widths, the normal distance between the reversely curved article retarding arms corresponding substantially to the width of the narrowest article. It is also noted that by reason of the link connection between said arms, they are, in all positions of their swinging movement, disposed equal distances from the center line of the conveyer and thus operate to accurately center the articles on the conveyer bed.

Obviously, the hereinbefore described invention admits of considerable modification without departing from the invention; therefore, I do not wish to be limited to the precise arrangements described.

What I claim is:

1. The combination with a power conveyer, comprising a way and traveling devices for propelling articles along said way, of article engaging arms normally extending into the path of the articles and yieldable to permit the passage therebetween of articles that are properly engaged by said traveling devices, said arms being shaped and adapted to return to their normal positions gradually and without jar during the passage of an article therebetween.

2. The combination with a power conveyer, comprising a way and traveling devices for propelling articles along said way, of article engaging arms normally extending into the path of the articles and yieldable to permit the passage therebetween of articles that are properly engaged by said traveling devices, and means whereby the engagement between said articles and said yielding arms is maintained during the return movement of said devices to their normal positions.

3. The combination with a power conveyer, comprising a way and traveling devices for propelling articles along said way, of article engaging arms normally extending into the path of the articles and yieldable to permit the passage therebetween of articles that are properly engaged by said traveling devices, means whereby the engagement between said articles and said yielding arms is maintained during the return movement of said arms to their normal positions, and means whereby said arms are adapted to yield under different pressures.

4. The combination with a power conveyer comprising a way and traveling devices for propelling articles along the same, of yieldable article engaging arms extending towards each other into the path of the articles and thence curving forwardly with the line of shortest distance between them located not far forward of the line that joins their pivotal end.

5. The combination with a power conveyer comprising a way and traveling devices for propelling articles along the same, of yieldable article engaging arms extending towards each other on opposite sides of said way and having reversely curved free end portions disposed in the path of said articles with the shortest distance between said arms located near the line that joins points of mounting.

6. The combination with a power conveyer comprising a way and traveling devices for propelling articles along the same, of yieldable article engaging arms extending towards each other crosswise of the path of the articles and having rebent free end portions that extend forwardly in the direction of the movement of the articles and outwardly towards the sides of the conveyer.

7. The combination with a power conveyer comprising a way and traveling devices for propelling articles along the same, of yieldable article engaging arms extending towards each other crosswise of the path of the articles and having reversely curved middle and free end portions, said yieldable arms being linked together for joint swinging movement towards and away from each other.

8. The combination with a power conveyer comprising a way and traveling devices for propelling articles along the same, of yieldable article engaging arms extending towards each other into the path of the articles and having curved middle and free end portions, said yieldable arms being linked together for joint swinging movement towards and away from each other, and means for yieldably holding said arms in the path of the articles.

9. The combination with a power conveyer comprising a way and traveling devices for propelling articles along the same, of a pair of upright rock shafts disposed one on each side of said conveyer, and having loop-shaped arms adapted to extend into the path of the articles, means for limiting the inward swinging movement of said arms, and means for normally yieldably holding said arms in the path of the articles with the shortest distance between them near the line that joins said shafts.

10. The combination with a power conveyer comprising a way and traveling devices for propelling articles along the same, of a pair of upright rock shafts disposed one on each side of said conveyer and having reversely curved arms adapted to extend into the path of the articles with the normal place of closest approach to each other slightly forward of the line that joins said shafts, means for limiting the inward swinging movement of said arms, means for normally yieldably holding said arms in the path of the articles, and means whereby said arms are adapted to yield under different pressures.

11. The combination with a power conveyer comprising a way and traveling devices for propelling articles along the same, of a pair of upright rock shafts disposed one on each side of said conveyer and having reversely curved arms adapted to extend into the path of the articles with their normally closest points not far from the line that joins said shafts, means for limiting the inward swinging movement of said arms, and means for normally yieldably holding said arms in the path of the articles, said arms comprising middle portions having a relatively small radius of curvature and free outer end portions having a relatively large radius of curvature.

Signed at St. Louis, Missouri, this 31st day of July, 1925.

WILLIAM J. BOHN.